United States Patent
Brosh et al.

(10) Patent No.: US 6,841,980 B2
(45) Date of Patent: Jan. 11, 2005

(54) APPARATUS FOR CONTROLLING VOLTAGE SEQUENCING FOR A POWER SUPPLY HAVING MULTIPLE SWITCHING REGULATORS

(75) Inventors: Richard M. Brosh, Manassas, VA (US); Scott C. Willis, Fairfax Station, VA (US)

(73) Assignee: BAE Systems, Information and Electronic Systems Integration, Inc., Nashua, NH (US)

( * ) Notice: Subject to any disclaimer, the term of this patent is extended or adjusted under 35 U.S.C. 154(b) by 43 days.

(21) Appl. No.: 10/458,545

(22) Filed: Jun. 10, 2003

(65) Prior Publication Data

US 2004/0251883 A1 Dec. 16, 2004

(51) Int. Cl.[7] .................................................. G05F 1/40
(52) U.S. Cl. ....................................................... 323/282
(58) Field of Search ............................... 323/268, 269, 323/271, 272, 282, 284, 289; 307/69, 71, 80, 81

(56) References Cited

U.S. PATENT DOCUMENTS

| 4,074,182 | A |   | 2/1978  | Weischedel |
|-----------|---|---|---------|------------|
| 4,459,538 | A | * | 7/1984  | Arai et al. ................. 323/275 |
| 5,200,692 | A |   | 4/1993  | Krinsky et al. |
| 5,258,701 | A |   | 11/1993 | Pizzi et al. |
| 5,467,009 | A |   | 11/1995 | McGlinchey |
| 5,760,571 | A |   | 6/1998  | Latham, II |
| 5,763,960 | A |   | 6/1998  | Ceccherelli et al. |
| 6,084,387 | A |   | 7/2000  | Amanai et al. |
| 6,111,395 | A |   | 8/2000  | Hirade et al. |
| 6,140,804 | A |   | 10/2000 | Parker |
| 6,184,729 | B1 | * | 2/2001 | Pasqualini ................. 327/112 |
| 6,208,041 | B1 |   | 3/2001 | Majumdar et al. |
| 6,642,750 | B1 | * | 11/2003 | Egan .......................... 327/63 |
| 6,781,257 | B1 | * | 8/2004 | Willis ......................... 307/77 |

* cited by examiner

*Primary Examiner*—Matthew V. Nguyen
(74) *Attorney, Agent, or Firm*—Daniel J. Long; Antony P. Ng; Dillon & Yudell LLP

(57) ABSTRACT

An apparatus for controlling voltage sequencing for a power supply having multiple switching regulators includes a first switching regulator, a second switching regulator, a first and second resistors, and a first and second transistors. The first switching regulator provides a positive output voltage at a positive voltage output. The second switching regulator provides a negative output voltage at a negative voltage output. When the voltage at a node between the first and second resistors exceeds a predetermined positive voltage, the first transistor turns on to limit the positive output voltage at the positive voltage output. When the voltage at the node between the first and second resistors drops below a predetermined negative voltage, the second transistor turns on to limit the negative output voltage at the negative voltage output.

9 Claims, 1 Drawing Sheet

APPARATUS FOR CONTROLLING VOLTAGE SEQUENCING FOR A POWER SUPPLY HAVING MULTIPLE SWITCHING REGULATORS

BACKGROUND OF THE INVENTION

1. Technical Field

The present invention relates to power supplies in general, and in particular to power supplies having multiple switching regulators. Still more particularly, the present invention relates to an apparatus for controlling voltage sequencing for a power supply having multiple switching regulators.

2. Description of the Related Art

In most electronic designs, a circuit board is populated with a number of electronic circuit devices, each of which may be powered by a single voltage source, such as a power supply having a positive voltage potential referenced to a ground voltage potential. Generally speaking, the electronic circuit devices receive power from the voltage source that is turned on and off in accordance with the requisite usage for the electronic circuit devices. In practice, it is often necessary to condition the input voltage from the power supply to be received at the electronic circuit devices in order to ensure the proper functioning of the electronic circuit devices.

Electronic circuit devices having multiple supply voltages are typically sensitive to voltage sequencing. Hence, problems associated with a typical electronic design usually arise when there is a need to sequence the electrical power supplied to a number of electronic circuit devices during power transitions. For example, the power supply AD588, manufactured by Analog Device, Inc., is a highly accurate voltage reference that requires +15 volt and −5 volt to generate a 10 volt reference voltage for precision circuitry. If during a power-out (ie., +V1 and −V2 are energized), the +15 volt is up before the −5 volt, the +10 volt reference may move to +13 volt. Likewise, if the −5 volt comes up before the +15 volt, the +10 volt reference may move to −2 volt.

Depending on the application and the circuit configuration, the shifting of reference voltage can cause very undesirable results such as loss of control, latch-up, etc. Consequently, it is desirable to provide an apparatus for controlling voltage sequencing for a power supply having multiple switching regulators such that reference voltage shifting can be avoided.

SUMMARY OF THE INVENTION

In accordance with a preferred embodiment of the present invention, an apparatus for controlling voltage sequencing for a power supply having multiple switching regulators includes a first switching regulator, a second switching regulator, a first and second resistors, and a first and second transistors. The first switching regulator provides a positive output voltage at a positive voltage output. The second switching regulator provides a negative output voltage at a negative voltage output. The first resistor and the second resistor are connected in series between the positive and negative voltage outputs. The first transistor and the second transistor are also connected in series between the positive and negative voltage outputs. The gates of the first and second transistors are connected to a node between the first and second resistors. When the voltage at the node between the first and second resistors exceeds a predetermined positive voltage, the first transistor turns on to limit the positive output voltage at the positive voltage output. On the other hand, when the voltage at the node between the first and second resistors drops below a predetermined negative voltage, the second transistor turns on to limit the negative output voltage at the negative voltage output.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawing, wherein.

DETAILED DESCRIPTION OF A PREFERRED EMBODIMENT

Figure 1:
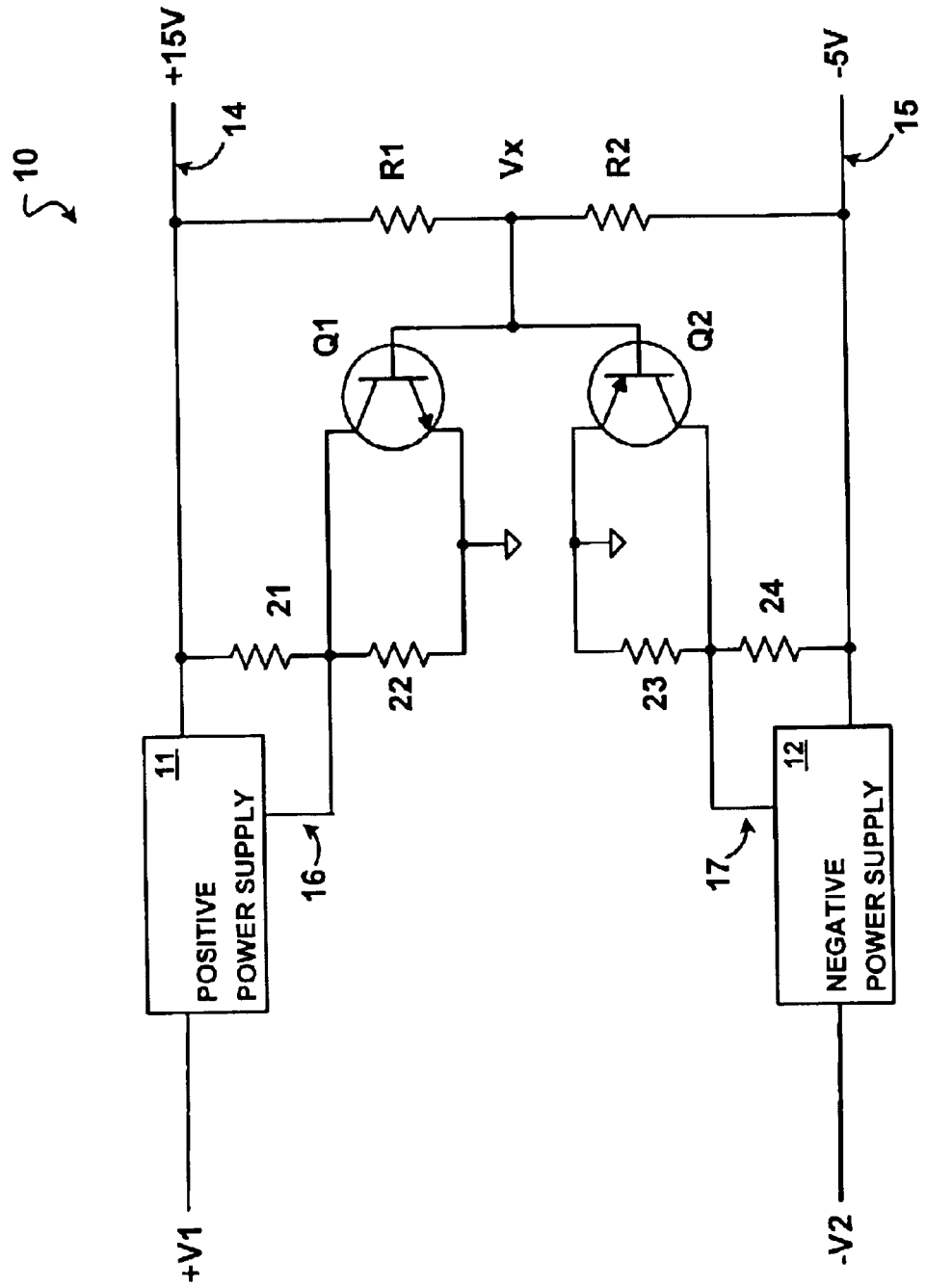
FIG. 1 is a circuit diagram of an apparatus for controlling voltage sequencing for a power supply having multiple switching regulators, in accordance with a preferred embodiment of the present invention.

Referring now to FIG. 1, there is illustrated a circuit diagram of an apparatus for controlling voltage sequencing for a power supply having multiple switching regulators, in accordance with the preferred embodiment of the present invention. As shown, a linear regulator tracking circuit 10 includes a first power supply 11, a second power supply 12, an NPN transistor Q1, a PNP transistor Q2, a resistor R1 and a resistor R2. Power supplies 11 and 12 are conventional standard positive and negative linear switching regulators, respectively, as they are known to those skilled in the art. For the present implementation, first power supply 11 and second power supply 12 are LM317 and LM337, respectively, both manufactured by Fairchild Semiconductor Corporation. A positive input voltage +V1 is input to first power supply 11, and in turn, first power supply 11 generates a regulated positive output voltage at a positive voltage output 14. Similarly, a negative voltage −V2 is input to second power supply 12, and in turn, second power supply 12 generates a regulated negative output voltage at a negative voltage output 15. For the present implementation, under normal conditions, the regulated positive output voltage at positive voltage output 14 is preferred to be +15 volt, and the regulated negative output voltage at negative voltage output 15 is preferred to be −5 volt.

Resistors R1 and R2 are divider resistors for determining when transistors Q1 and Q2 are being turned on. Preferably, transistors Q1 and Q2 are PN2222 and PN2907, respectively, both manufactured by Fairchild Semiconductor Corporation. Resistors R1 and R2 are connected in series between positive voltage output 14 and negative voltage output 15. The gate of transistor Q1 is connected to a node Vx located between resistor R1 and resistor R2. The collector of transistor Q1 is connected to a voltage control input 16 of first power supply 11. The collector of transistor Q1 is also connected to positive voltage output 14 via a resistor 21. The emitter of transistor Q1 is connected to ground. The emitter of transistor Q1 is also connected to voltage control input 16 of first power supply 11 via a resistor 22. In addition, the emitter of transistor Q1 is connected to positive voltage output 14 via resistor 21 and resistor 22.

The gate of transistor Q2 is connected to node Vx. The collector of transistor Q2 is connected to a voltage control input 17 of second power supply 12. The collector of transistor Q2 is also connected to negative voltage output 15 via a resistor 24. The emitter of transistor Q2 is connected to ground. The emitter of transistor Q2 is also connected to voltage control input 17 of second power supply 12 via a resistor 23. In addition, the emitter of transistor Q2 is connected to negative voltage output 15 via resistor 23 and resistor 24.

For the present implementation, the value of resistor R1 is preferably 15 KΩ and the value of resistor R2 is preferably 5 KΩ. Also, the value of resistor 21 is preferably 240 Ω, the value of resistor 22 is preferably 2.61 K Ω, the value of resistor 23 is preferably 750 Ω and the value of resistor 24 is preferably 240 Ω.

When first power supply 11 and second power supply 12 are operating under normal operating conditions, node Vx is at 0.0 volt and both transistors Q1, Q2 are turned off. If the positive output voltage at positive voltage output 14 starts to come up while negative output voltage at negative voltage output 15 is still down, then the voltage at node Vx will increase to approximately 0.7 volt and transistor Q1 will be turned on. Under normal operating conditions, the voltage across resistor 21 is approximately +1.2 V (for voltage control input 16) to maintain normal voltage output from first power supply 11 to positive voltage output 14. However, when transistor Q1 is turned on, the voltage across resistor 21 increases to approximately +15 V. As a result, first power supply 11 limits its +15 volt positive output voltage at positive voltage output 14.

On the other hand, if the negative output voltage at negative voltage output 15 starts to come up while the positive output voltage at positive voltage output 14 is still down, then the voltage on node Vx will drop to approximately −0.7 volt, and transistor Q2 will be turned on. Under normal operating conditions, the voltage across resistor 24 is approximately −1.2 V (for voltage control input 16) to maintain normal voltage output from second power supply 12 to negative voltage output 15. However, when transistor Q2 is turned on, the voltage across resistor 24 decreases to approximately −5 V. As a result, 6 second power supply 12 limits its −5 volt negative output voltage at negative voltage output 15. For example, when the negative output voltage at negative voltage output 15 reaches −4 volt, the positive output voltage at positive voltage output 14 should be between +10 volt and +15 volt.

As has been described, the present invention provides an apparatus for controlling voltage sequencing for multiple switching regulators.

While the invention has been particularly shown and described with reference to a preferred embodiment, it will be understood by those skilled in the art that various changes in form and detail may be made therein without departing from the spirit and scope of the invention.

What is claimed is:

1. An apparatus for controlling voltage sequencing for a power supply having multiple switching regulators, said apparatus comprising:
    a first regulator for providing a positive output voltage at a positive voltage output;
    a second regulator for providing a negative output voltage at a negative voltage output;
    a first resistor and a second resistor connected in series between said positive and negative voltage outputs; and
    a first transistor and a second transistor connected in series between said positive and negative voltage outputs, wherein gates of said first and second transistors are connected to a node between said first and second resistors, wherein said first transistor turns on to limit said positive output voltage at said positive voltage output in response to a voltage at said node between said first and second resistors exceeds a predetermined positive voltage, wherein said second transistor turns on to limit said negative output voltage at said negative voltage output in response to a voltage at said node between said first and second resistors drops below a predetermined negative voltage.

2. The apparatus of claim 1, wherein said first transistor is an NPN transistor.

3. The apparatus of claim 1, wherein said second transistor is a PNP transistor.

4. The apparatus of claim 1, wherein said first and second regulators are switching regulators.

5. The apparatus of claim 1, wherein said positive output voltage is approximately +15 volt and said negative output voltage is approximately −5 volt.

6. The apparatus of claim 4, wherein said predetermined positive voltage is approximately +0.7 volt and said predetermined negative voltage is approximately −0.7 volt.

7. The apparatus of claim 1, wherein said first resistor is 15 KΩ and said second resistor is 5 KΩ.

8. The apparatus of claim 1, wherein said apparatus further includes a first set of biasing resistors connected between said first transistor and said positive voltage output.

9. The apparatus of claim 8, wherein said apparatus further includes a second set of biasing resistors connected between said second transistor and said negative voltage output.

* * * * *